United States Patent [19]

Hubbard et al.

[11] 4,306,403
[45] Dec. 22, 1981

[54] OVERLOAD SENSOR FOR A COTTON HARVESTER UNIT DRIVE

[75] Inventors: Arthur L. Hubbard; Kenneth C. McConnell, both of Ankeny, Iowa

[73] Assignee: Deere & Company, Moline, Ill.

[21] Appl. No.: 197,838

[22] Filed: Oct. 17, 1980

[51] Int. Cl.³ ............................................ A01D 75/18
[52] U.S. Cl. ......................................... 56/10.3; 56/28; 192/30 W
[58] Field of Search ............................ 56/10.3, 28–50; 116/230; 192/56 R, 67 R, 89 A, 30 W; 64/28 R

[56] References Cited

U.S. PATENT DOCUMENTS

| | | | |
|---|---|---|---|
| 3,756,042 | 9/1973 | Heth et al. | 192/30 W |
| 3,845,479 | 10/1974 | Fabry | 192/30 W |
| 3,863,428 | 2/1975 | Baxter | 56/10.2 |
| 4,211,314 | 7/1980 | Clason | 192/4 A |

Primary Examiner—Robert A. Hafer

[57] ABSTRACT

A device for sensing the loading on an input drive of a cotton harvesting unit and providing a warning when an overload of the drive occurs. Normal tension in the belt drive to the unit input shaft is balanced by an adjustable spring load. Overload of the input shaft overcomes the spring load to activate an electrical switch that alerts the operator by lighting a warning lamp. The input drive includes a slip clutch, and the spring load is adjusted so that a warning is provided before the drive load reaches the loading which would cause the clutch to begin to slip.

11 Claims, 3 Drawing Figures

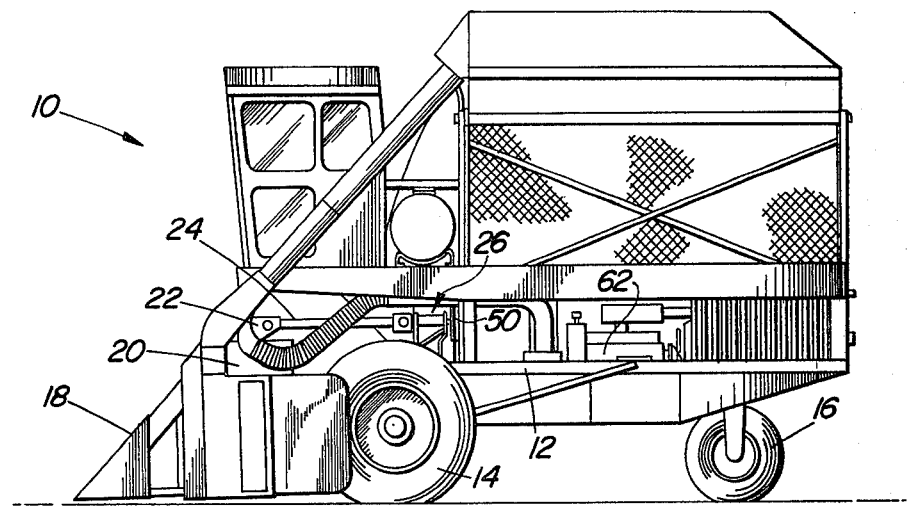
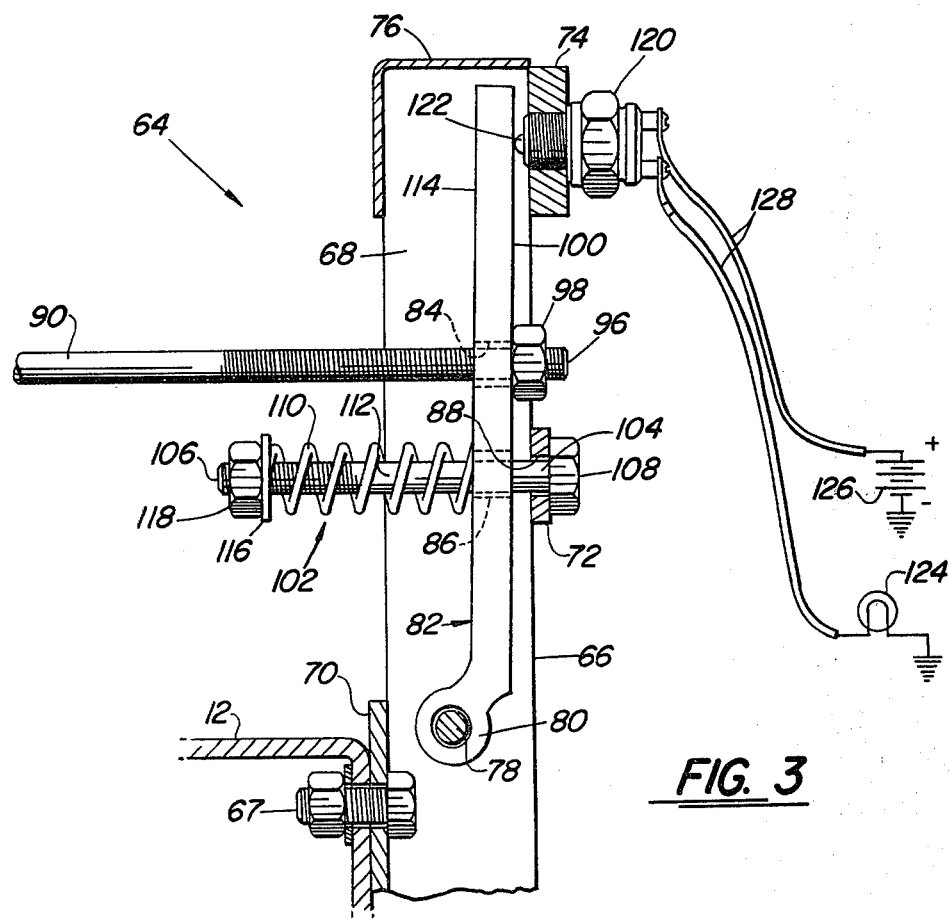

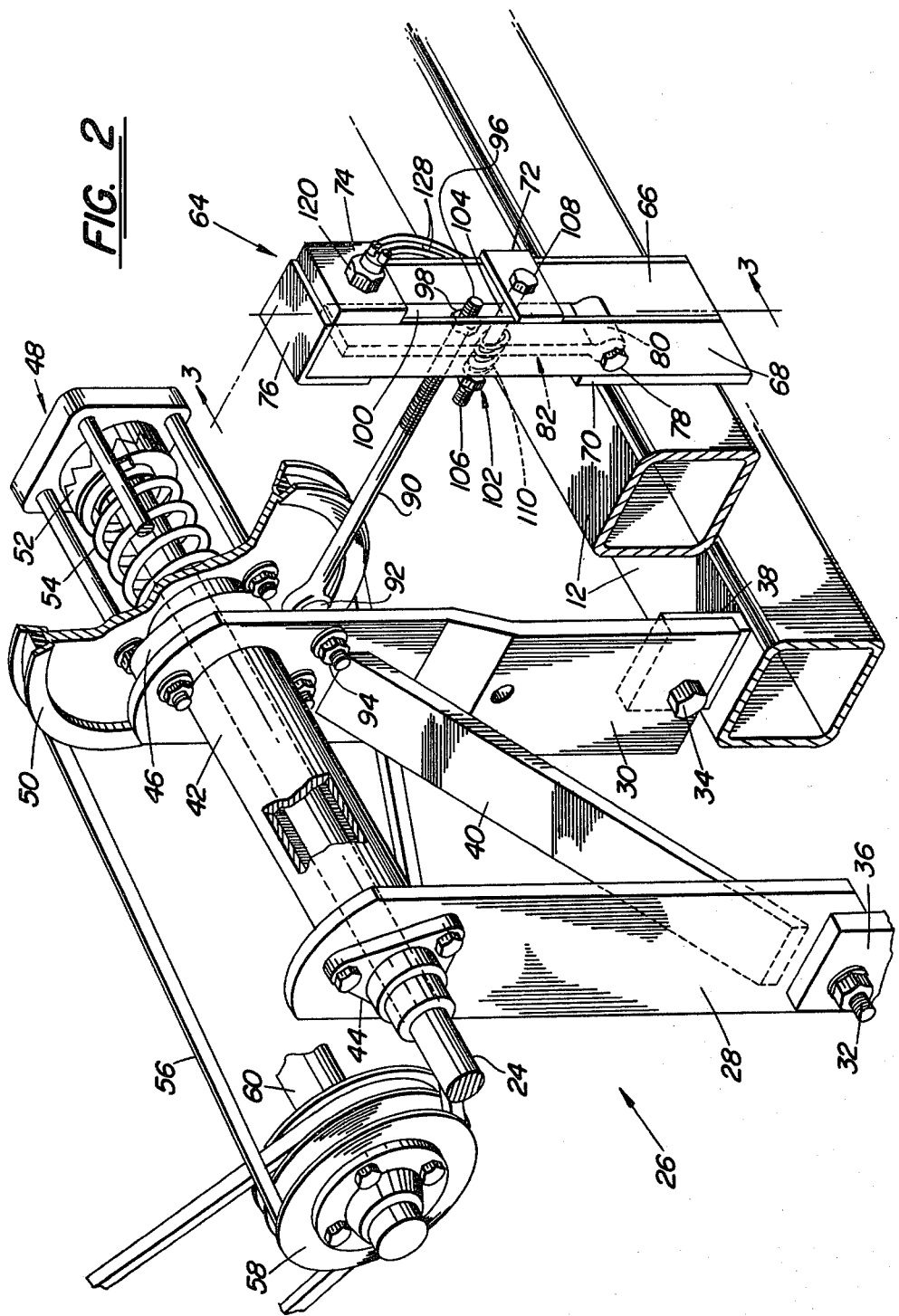

OVERLOAD SENSOR FOR A COTTON HARVESTER UNIT DRIVE

BACKGROUND OF THE INVENTION

The present invention relates generally to cotton harvesters and more specifically to an overload sensor for the input drive of a cotton harvester.

A typical cotton harvester includes a plurality of individual picking units, each with upright picker bar drums and doffer columns for removing cotton from a row of cotton plants and directing it to a conveyor system. The picker drums and doffer columns are driven by a transmission operably connected by a universal joint to one end of a drive shaft. The opposite end of the drive shaft is carried by a shaft support pivotally connected to the harvester frame about a pivotal axis generally parallel to the drive shaft axis. A pulley is mounted on the drive shaft adjacent the support and is driven by a belt trained around a main drive pulley. A bolt having an adjusting nut is connected between the frame and the shaft support. The tension in the belt is adjusted by turning the adjusting nut which pivots the shaft support to move the drive shaft pulley toward or away from the main drive pulley. The above-described drive arrangement is shown, for example, on the John Deere 9900 Cotton Picker. A slip clutch is provided, either at the input to the transmission or at the drive shaft pulley. When free running operation of the picking unit is prevented, the slip clutch associated with the drive shaft will slip to remove drive from the unit. Overloads can occur when a unit plugs with cotton, a unit encounters an obstruction or dirt builds up within a unit. Cold or stiff grease can also cause an overload of the input drive shaft.

Although the slip clutch associated with the drive shaft provides protection from overloads, it has not been entirely satisfactory. The slip clutch must not begin to slip until the loading on the drive shaft exceeds the maximum encountered during normal operation of the picker unit. Therefore, the operator will have no indication that a problem is developing until the clutch actually slips. The operator may not hear the clutch immediately when it begins to slip because of both the level of noise associated with the harvester during the picking of the cotton and the improved sound isolation of the cab from the remainder of the harvester. As a result, the overload condition may not be detected immediately and may cause machine damage or loss of cotton. The longer the overload condition remains undetected, the more likely it is that it will worsen and result in increased maintenance time and decreased productivity.

It is therefore an object of the present invention to provide a device for the early detection of an overload or an impending overload condition in a cotton harvester row unit.

It is another object of the present invention to provide a device for monitoring the loading of the drive for a cotton harvester row unit and providing a warning when the loading exceeds a preselected limit. It is a further object to provide such a device which is relatively simple and inexpensive to manufacture and which is easily adjustable.

It is still another object of the invention to provide a relatively simple and inexpensive device for the drive shaft of a cotton harvester row unit which functions both as an adjustable belt tightener and as a shaft overload sensor. It is another object to provide such a device which provides a warning when the sensed load increases beyond a preselected limit and which includes an adjustment for setting the desired load limit.

It is yet another object of the invention to provide a device for monitoring the loading on a slip clutch-protected cotton harvester row unit which provides a signal to the operator of the harvester to warn him of an impending overload condition before the slip clutch begins to slip.

A support assembly pivotally connected to the frame of the cotton harvester carries a row unit drive shaft adjacent a first pulley operably connected by a belt to a main drive pulley. An eyebolt is connected at its eye end to the support assembly and at its threaded end to a sensor arm by a nut. The sensor arm is biased in the direction to cause the support assembly to tension the belt between the drive and driven pulleys. The spring rate of the spring assembly is preloaded to balance the belt tension required to drive the row unit under normal conditions. When the row unit is loaded beyond normal conditions, the preload of the spring is overcome and the sensor arm moves. Sensor arm movement activates a switch which lights a lamp to alert the operator that an overload condition exists. Belt tension is adjusted by turning the nut threaded into the eyebolt.

When the row unit is operating under normal load conditions, the spring assembly maintains the switch in the off condition. If an overload occurs in the unit, the tension in the drive belt increases and the sensor arm moves against the bias of the spring assembly to activate the switch and provide an early warning to the operator. The operator is then able to take immediate action to remedy the problem causing the overload. The device is relatively simple and inexpensive, and provides for easy adjustment of both belt tension and overload sensitivity. Sensitivity is set so that the operator is warned of an impending overload condition prior to operation of the slip clutch.

These and other objects, features and advantages will become apparent to those skilled in the art upon a reading of the following description of the preferred embodiment taken with the drawings.

BRIEF DESCRIPTION OF THE DRAWINGS

FIG. 1 is a side view of a cotton harvester embodying the present invention.

FIG. 2 is an enlarged perspective view, partially broken away, of a portion of the drive assembly and the overload sensor associated therewith.

FIG. 3 is a sectional view of the sensor taken essentially along the lines 3—3 of FIG. 2.

DESCRIPTION OF THE PREFERRED EMBODIMENT

Referring to FIG. 1, there is shown a cotton harvester 10 having a frame 12 supported on forward drive wheels 14 and rear steering wheels 16. Row units 18 are supported from the frame 12 forwardly of the drive wheels 14 and include conventional harvesting mechanisms for removing cotton from rows of cotton plants. Upper compartments 20 of the row units 18 house a transmission (not shown) operably connected to the harvesting mechanisms. Each transmission is driven through a bevel gear 22 by a unit input drive shaft 24 which extends rearwardly from the corresponding row unit 18. The aft end of the unit input drive shaft 24 is supported from the frame 12 by a shaft support assembly 26. As best seen in FIG. 2, the shaft support assembly 26 includes forward and rear support arms 28 and 30 connected by pivot pins 32 and 34 to brackets 36 and 38 mounted on the frame 12. A diagonal brace 40 extends from the lower end of the arm 28 to the upper end of the arm 30. The upper ends of the arms 28 and 30 are spaced by a tubular member 42. The aft end of the input drive shaft 24 extends through the tubular member 42 and is journalled in bearings 44 and 46 mounted on the arms 28 and 30 respectively. The pivot pins 32 and 34 are axially aligned, and the axis of the shaft 24 is substantially parallel to the pivotal axis of the shaft support assembly 26. A conventional slip clutch assembly 48, shown schematically in FIG. 2, includes a driven pulley 50 and is supported on the aft end of the shaft 24 adjacent the bearing 46. Under normal shaft load conditions, the shaft 24 is constrained to rotate with the pulley 50. When the loading on the shaft exceeds a preselected limit, jaws 52 act against the bias of the spring 54 and separate to allow the pulley 50 to rotate with respect to the shaft 24. A belt 56 is trained around the pulley 50 and a drive pulley 58 which is mounted on a main drive shaft 60 driven in a conventional manner from an engine 62.

An adjustable belt tensioning and load sensing device, indicated generally at 64 in FIGS. 2 and 3, includes an upright bracket 66 connected by bolts 67 to the frame 12 generally in transverse alignment with the rear support arm 30. The bracket 66 includes parallel fore-and-aft sides 68 connected by an inside lower plate 70, an outside center plate 72, an upper plate 74 and an upper angle 76. A pivot pin 78 extends through the sides 68 near the frame 12 and through a lower hinge portion 80 of an upright sensor arm 82. The arm 82 is flat and extends upwardly between the sides 68. The arm 82 includes a central aperture 84 and a lower aperture 86 transversely aligned with an aperture 88 in the center plate 72.

An eyebolt 90 has its eye end connected by a bushing 92 and a bolt 94 to the rear support arm 30 adjacent the bearing 46 and the pulley 50. Threaded end 96 of the eyebolt 90 extends transversely through the central aperture 84 of the arm 82, and a nut 98 is threaded over the end 96 against outer face 100 of the arm 82.

An adjustable spring preload assembly shown generally at 102 urges the arm 82 in the clockwise direction about the pivot 78, as viewed in FIGS. 2 and 3. The preload assembly 102 includes a bolt 104 having a threaded end 106 extending inwardly through the apertures 86 and 88 with the head end 108 abutting against the outer face of the center plate 72. A spring 110 is placed over shank 112 of the bolt 104 and is compressed between inner face 114 of the arm 82 and a washer 116 by a spring preload adjusting nut 118. As best seen in FIG. 3, the spring 110 maintains the outer face 100 of the arm 82 against the nut 98 to bias the eyebolt 90 to the right and maintain the belt 56 (FIG. 2) in tension. The spring rate of the spring 110 is selected so that the spring preload of the assembly 102 can be adjusted with the nut 118 to provide a sufficient clockwise moment on the arm 82 to balance the counterclockwise moment transferred from the shaft support assembly 26 as the belt 56 is operating under normal peak load drive tension. The nut 98 is adjusted for proper no- or low-load tension in the belt 56, which of course is less than the peak load tension. When the force required to balance the tension in the belt 56 exceeds the preload of the assembly 102, the arm 82 pivots counterclockwise against the bias of the spring 110.

A normally-on electric switch 120 is supported adjacent the upper end of the arm 82 by the upper plate 74. The switch 120 includes an actuator 122 which is depressed by the outer face 100 of the arm 82 when the shaft 24 is operating under normal load conditions and the assembly 102 is maintaining the arm 82 in the position shown in FIG. 3. When the actuator is depressed, the switch 120 is maintained in the off condition. However, if the loading on the shaft 24 increases so that the tension in the belt 56 increases beyond that which the spring preload assembly 102 can balance, the arm 82 will pivot counterclockwise against the bias of the spring 110 so that the face 100 moves away from the switch 120 to allow the actuator 122 to extend and turn the switch to the on condition.

The switch 120 is connected in series between a warning lamp 124 on the instrument panel and a battery 126 by conductors 128. When the spring preload can no longer balance the belt tension, the arm 82 moves to actuate the switch 120 and light the lamp 124 thereby providing an immediate warning when the loading on the shaft 24 exceeds a preselected limit determined by the preload adjustment of the assembly 102. In the preferred embodiment, the spring preload is selected so that the spring 110 will be compressed sufficiently for the arm 82 to actuate the switch 120 when the load on the shaft 24 is above the normal peak load but is less than the maximum load at which the slip clutch assembly 48 begins to slip. The operator therefore will receive a warning prior to the time the row unit is overloaded to the point where the clutch begins slipping so he can take immediate corrective action, such as slowing ground speed or removing dirt or cotton plugging. To adjust the sensitivity of the sensing device 64, the spring preload adjusting nut 118 is turned. By compressing the spring 110, the shaft load required to tension the belt 56 to overcome the preload will be increased, thereby decreasing the sensitivity of the device. Increasing the length of the spring 110 by unthreading the nut 118 decreases the force urging the arm 82 in the clockwise direction and lessens the belt tension required to overcome the preload and activate the switch 120. Adjustment of the support assembly 26 to accommodate variations in belt length caused by wearing and stretching of the belt 56 or by belt replacement is accomplished easily and independently of the spring preload adjustment by turning the nut 98 on the eyebolt 90.

In the preferred embodiment, the axes of the shafts 24 and 60, and the pivots 32, 34, and 78 are parallel, so that the shaft support assembly 26 and sensor arm 82 rock in a direction substantially transverse to the axes of the shafts. The centers of the apertures 86 and 84 in the sensor arm 82 are offset about 3.25 inches and 4.75 inches, respectively, above the axis of the pivot pin 78. The axis of the shaft 24 is supported by the support assembly 26 about 13.25 inches above the pivots 32 and 34. The eyebolt 90 is connected to the arm 30 about 11 inches above the pivot 34. The force exerted on the sensor arm 82 by the spring preload assembly 102 must be more than the tension in the eyebolt 90 to prevent the arm 82 from pivoting counterclockwise because the moment arm is longer for the eyebolt 90. Also, as is evident from FIG. 3, a small linear movement of the eyebolt 90 results in a larger movement of the sensor arm 82 at the switch 120, and only a small amount of compression of the spring 110 from the position shown is required to activate the warning lamp 124.

The load sensing device also provides a convenient method of adjusting belt tension. The belt 56 installed over the pulleys 50 and 58, and then the nut 98 is tightened until the belt tension overcomes the spring preload of the assembly 102 sufficiently to activate the warning lamp 124. The nut 98 is then loosened on the eyebolt 90 until the lamp 124 goes off. Thereafter, the nut 98 is loosened an additional number of turns to achieve the proper no-load tension. The actual number of turns can be determined empirically for a given system. In the embodiment shown, the nut 98 is loosened about an additional 3/4 turn after the lamp goes off.

In operation under normal load conditions, the tension in the belt 56 is insufficient to overcome the preload of the assembly 102, and the switch 120 remains off. If the row unit 18 begins to clog with cotton or dirt, or if an obstacle becomes lodged in the harvesting mechanism, the loading on the harvesting unit input shaft 24 will increase to thereby increase the tension in the belt 56 and in the eyebolt 90. When the tension in the eyebolt 90 increases beyond that which can be balanced by the assembly 102 acting on the arm 82, the shaft support assembly 26 will rock toward the left (FIG. 2) about the pivots 32 and 34 causing the arm 82 to compress the spring 110 and rock toward the left about its pivot 78. The switch 120 will close to activate the warning lamp 124 and alert the operator that an overload condition is occurring.

Having described the preferred embodiment, it will be apparent that modifications can be made without departing from the scope of the invention as defined in the accompanying claims.

We claim:

1. In a cotton harvester including a frame, an engine mounted on the frame, a harvesting unit supported from the frame and having a harvesting mechanism for removing cotton from cotton plants, a drive arrangement comprising:
    a shaft drivingly connected to and variably loaded by the harvesting mechanism;
    a first pulley connected for rotation with the shaft about the shaft axis;
    a second pulley drivingly connected to the engine;
    belt means tensioned between the first and second pulleys for driving the second pulley from the first pulley, wherein the tension in the belt means is a function of the shaft load;
    first means rockably connected to the frame for rotatably supporting the shaft adjacent the first pulley and for permitting the shaft to move generally transversely to its axis;
    second means for biasing the shaft support means transversely away from the second pulley and permitting the shaft support means to move toward the second pulley upon the tension in the belt means reaching a preselected limit; and
    alarm means responsive to movement of the shaft support means toward the second pulley for providing a signal indicating a shaft overload condition.

2. The invention as set forth in claim 1 wherein the second means includes an arm member pivotally connected to the frame, a link connecting the arm member for movement with the shaft support means, and spring means connected between the frame and the arm member for maintaining the link in tension between the arm member and shaft support means.

3. The invention as set forth in claim 2 wherein the spring means comprises a preloaded spring assembly having a spring rate to maintain sufficient tension in the link to prevent the shaft support means from moving towards the second pulley until the tension in the belt means exceeds the preselected limit.

4. The invention as set forth in claim 3 wherein the preload spring is adjustable to vary the preselected limit.

5. The invention as set forth in claims 2, 3 or 4 wherein the link is adjustable to accommodate changes in length of the belt means.

6. The invention as set forth in claim 1 further comprising a slip clutch connected between the second pulley and the harvesting mechanism operable to remove drive from the harvesting mechanism when the loading on the shaft exceeds a given limit, said given limit exceeding that required for tensioning the belt to the preselected limit.

7. In a cotton harvester including a frame, an engine mounted on the frame, a harvesting unit supported from the frame and having a harvesting mechanism for removing cotton from cotton plants, a drive arrangement comprising:
    a shaft drivingly connected to and variably loaded by the harvesting mechanism;
    a first pulley connected for rotation with the shaft;
    first means supporting the first pulley on the frame for transverse movement with respect to its axis of rotation;
    a second pulley drivingly connected to the engine;
    endless belt means tensioned between the first and second pulleys for driving the first pulley from the second;
    second means connected to the first means for selectively positioning the first pulley and adjusting the tension in the belt means between the pulleys;
    third means operably associated with the second means for maintaining the first pulley in the selected position when the tension in the belt means is equal to or less than a preselected limit corresponding to the tension required to drive the first pulley and the shaft at a preselected harvester mechanism loading and for permitting the first pulley to move toward the second pulley when the tension in the belt means exceeds the preselected limit; and
    alarm means responsive to the movement of the first pulley toward the second pulley for providing an indication of shaft load condition.

8. The invention as set forth in claim 7 wherein the second means comprises a tension link having an adjustable effective length and connected at one end to the first means, and an arm member connected to the opposite end of the link, and wherein the third means comprises means for biasing arm member to a preselected position to maintain the link in tension, said means for biasing including preloaded spring means for maintaining the arm member in the preselected position when the tension in the link is equal to or less than the tension required to balance the preselected tension limit of the belt means and for permitting the arm member to move when the preselected tension limit of the belt means is exceeded.

9. The invention as set forth in claim 8 wherein the preloaded spring means includes means for adjusting the preselected tension limit.

10. The invention as set forth in claim 9 wherein the arm member is pivotally connected to the frame, and the means for biasing includes an adjustable length spring connected between the frame and a portion of the arm member offset from the pivotal connection.

11. In a cotton harvester including a frame, an engine mounted on the frame, a harvesting unit supported from the frame and having a harvesting mechanism for removing cotton from cotton plants, a drive arrangement comprising:

a shaft drivingly connected to and variably loaded by the harvesting mechanism;

a first pulley connected for rotation with the shaft;

a shaft support rockably connected to the frame and rotatably supporting the shaft adjacent the pulley, said shaft support rockable in a direction generally transverse to the axis of the shaft;

a second pulley drivingly connected to the engine;

endless belt means tensioned between the first and second pulleys for driving the first pulley from the second;

belt tension adjusting means connected between the shaft support and the frame and movable with the shaft support for adjusting the position of the first pulley with respect to the second pulley to vary the tension in the endless belt means;

a sensor arm connected to the tension adjusting means for movement therewith including means for biasing the sensor arm and the adjusting means to a first position to maintain the first pulley in the adjusted position when the tension in the endless belt means is equal to or less than a preselected tension, and for permitting the sensor arm and tension adjusting means to move away from the first position against the bias when the tension in the endless belt means exceeds the preselected tension;

means responsive to the movement of the sensor arm away from the first position for providing a signal indicative of shaft load.

* * * * *